United States Patent
Kuhlmann et al.

(10) Patent No.: US 6,861,593 B2
(45) Date of Patent: Mar. 1, 2005

(54) WEIGHING SENSOR WITH CALIBRATION WEIGHT

(75) Inventors: Otto Kuhlmann, Goettingen (DE); Thorsten Capelle, Friedland (DE); Peter Fleischer, Goettingen (DE); Friedrich Helmsen, Goettingen (DE); Detlev Erben, Goettingen (DE); Rudolf Mueller, Bovenden (DE)

(73) Assignee: Sartorius Aktiengesellschaft, Goettingen (DE)

( * ) Notice: Subject to any disclaimer, the term of this patent is extended or adjusted under 35 U.S.C. 154(b) by 0 days.

(21) Appl. No.: 10/428,949

(22) Filed: May 5, 2003

(65) Prior Publication Data

US 2004/0003948 A1 Jan. 8, 2004

Related U.S. Application Data

(63) Continuation of application No. PCT/EP01/12487, filed on Oct. 29, 2001.

(30) Foreign Application Priority Data

Nov. 4, 2000 (DE) .......................................... 100 54 847

(51) Int. Cl.[7] .............................................. G01G 23/01
(52) U.S. Cl. ............................... 177/210 EM; 177/212; 177/229; 73/1.13
(58) Field of Search .................. 73/1.13; 177/210 EM, 177/212, 229

(56) References Cited

U.S. PATENT DOCUMENTS 4,343,373 A * 8/1982 Stadler et al. ................. 177/50
4,766,965 A * 8/1988 Luchinger ..................... 177/50
4,890,246 A * 12/1989 Oldendorf et al. ........... 702/101
4,932,487 A * 6/1990 Melcher et al. ................ 177/50
5,721,398 A * 2/1998 Balsen et al. ................ 177/184
5,866,854 A * 2/1999 Emery et al. .................. 177/50
6,194,672 B1 * 2/2001 Burkhard et al. ..... 177/210 EM
6,414,252 B1 * 7/2002 Emery et al. ................ 177/229

FOREIGN PATENT DOCUMENTS

| DE | 195 40 782 C1 | 12/1996 |
| DE | 196 05 087 C2 | 8/1997 |
| DE | 199 53 987 A1 | 5/2000 |
| DE | 199 23 207 C1 | 10/2000 |
| DE | 100 07 267 A1 | 7/2001 |

* cited by examiner

*Primary Examiner*—Randy W. Gibson
(74) *Attorney, Agent, or Firm*—Sughrue Mion, PLLC

(57) ABSTRACT

A weighing sensor including a base (1) fixed to a housing, a load sensor (2) connected to the base in a displaceable manner via two arms (3, 4), a lever system (8 ... 11) having at least one lever and transmitting the load acting on the load sensor to a transducer (12, 13), and a built-in calibration weight (40) which may be lowered onto a support region (30/38) for checking and/or calibrating the sensitivity of the weighing sensor. The support region is guided in a parallel manner by two additional arms (21, 22) and is connected to a lever (9/39) of the lever system (8 ... 11) via a coupling element (26). Relatively large loads on the weighing sensor may be simulated with relatively small calibration weights, without the need for complicated lifting devices. The two additional arms (21, 22) are connected on the one hand to the support region (30/38) and on the other hand to the load sensor (2) and are located on the side of the load sensor (2) opposite from the lever system (8 ... 11).

15 Claims, 1 Drawing Sheet

WEIGHING SENSOR WITH CALIBRATION WEIGHT

This is a Continuation of International Application PCT/EP01/12487, with an international filing date of Oct. 29, 2001, which was published under PCT Article 21(2) in German, and the disclosure of which is incorporated into this application by reference.

FIELD OF AND BACKGROUND OF THE INVENTION

The invention relates to a weighing sensor with a base that is fixed to the housing, a load sensor connected to the base in a displaceable manner using two arms, a lever system that has at least one lever and that transmits the load acting on the load sensor to a transducer, and a built-in calibration weight that can be lowered onto a support region to check and/or calibrate the sensitivity of the weighing sensor. The support region is parallel-guided using two additional arms and is connected to a lever of the lever system using a coupling element.

Weighing sensors of this type are known, for instance, from German Patent Specification DE 196 05 087 C2. They are preferably used in high-resolution scales for maximum loads of between 100 g and 100 kg. The lever system reduces the load acting on the load sensor to a smaller load that is capable of being processed by the transducer. The transducer that is often used is the coil/magnet combination of an electromagnetic force compensation. Other transducers, however, may be used instead, e.g., vibrating strings or strain gauges. The built-in calibration weight acts on a lever of the lever system and makes it possible to simulate a relatively large load on the load sensor with a relatively small calibration load. The two additional arms of the parallel guidance for the support region of the calibration weight connect the support region with the base fixed to the housing and thereby ensure a certain independence of the location where the calibration weight is supported. However, they cause substantial space problems in the space between the load sensor, the base fixed to the housing and the two arms. As a result, they significantly restrict the design options for the lever system and the additional parallel guidance, and also tend to increase the overall height of the weighing sensor.

To obviate these disadvantages, it has already been proposed (DE 100 07 267) to accommodate the calibration weight not in the space defined by the load sensor, the base fixed to the housing and the arms, but instead on the other side of the load sensor, by extending one lever arm of the lever system through the load sensor, and to lower the calibration weight directly onto this lever arm. However, lowering the calibration lever onto a lever arm of a transmission lever causes the action of the calibration weight to strongly depend on the location where the weight is supported. As a result, the lifting device or weight support must be very precise and consequently becomes costly.

Similarly, German Laid Open Document DE 199 53 987 A1 proposes to extend a transmission lever using two metal plates that are laterally attached by screws, and to provide each of these extension plates with a notch for receiving a calibration weight. The calibration weight is therefore again lowered onto a transmission lever, so that the strong location dependence described above is present in this variant as well.

OBJECTS OF THE INVENTION

One object of the invention is to obviate the space problems in the space between the load sensor, the base fixed to the housing and the two arms, without the need of having to resort to a complex lifting device.

SUMMARY OF THE INVENTION

According to one formulation of the invention, this and other objects are attained by connecting the two additional arms with the support region on the one hand and with the load sensor on the other, and by locating the two additional arms on the side of the load sensor opposite from the lever system.

The two additional arms are thus not coupled to the base fixed to the housing, as in the prior art, but to the load sensor. This makes it possible to arrange the additional arms not in the space between the load sensor and the base fixed to the housing but rather on the opposite side of the load sensor, since a connection to the base is no longer necessary. Because the load sensor is connected to the base via the two (main) arms, the support region for the calibration weight in the structure according to the invention is indirectly parallel-guided with the base. A direct connection is not necessary, however.

Advantageous embodiments and further refinements of the invention are described below and set forth in the dependent claims.

BRIEF DESCRIPTION OF THE DRAWINGS

The invention will now be described in greater detail with reference to the figures, in which.

DETAILED DESCRIPTION OF THE PREFERRED EMBODIMENTS

Figure 1:
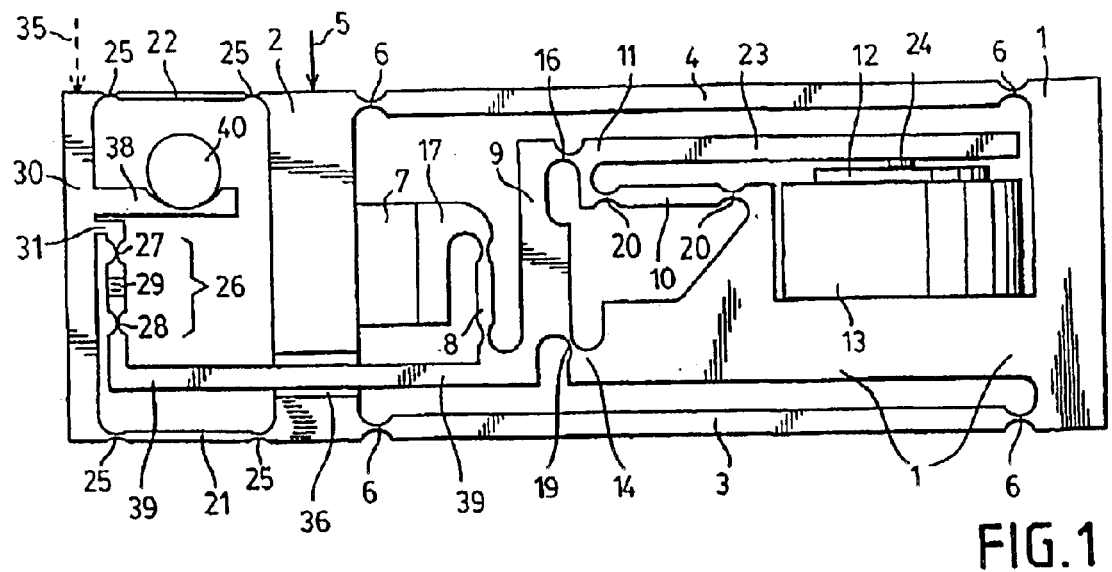
FIG. 1 shows a schematic side view of the weighing sensor.

FIG. 1 shows a schematic side view of the weighing sensor illustrating the weighing sensor's basic structure. The figure shows a load sensor 2, which is connected to a basic body 1 fixed to the housing via an upper arm 4 and a lower arm 3 in a parallel motion arrangement. The numeral 6 identifies the articulation points of the arms. The weighing pan (not shown) is mounted to the load sensor 2. A vertical arrow 5 indicates the force exerted by the material being weighed. The weight force of the material being weighed is transmitted from a projection 7/17 of the load sensor 2 via a first, vertical force transmission element 8 to a rectangular lever 9. The rectangular lever 9 is supported on a projection 14 of the basic body 1 by a thin spot 19. The short, horizontal lever arm of the rectangular lever 9 equals the horizontal distance between the force transmission element 8 and the thin spot 19. The long, vertical lever arm equals the vertical distance between the thin spot 19 and the thin spot 16.

At the thin spot 16, the reduced and redirected weight force is transmitted to a second rectangular lever 11, which is supported on the basic body 1 via a horizontal force transmission element 10. The short, vertical lever arm of the rectangular lever 11 equals the vertical distance between the thin spot 20 of the force transmission element 10 and the thin spot 16. The longer, horizontal lever arm 23 of the rectangular lever 11 equals the horizontal distance between the thin spot 16 and the mounting point 24 of the coil. The coil 12 is located in the air gap of the permanent magnet 13, which is mounted directly to the basic body 1.

The above-described arrangement of the parallel guidance and the lever system consisting of the two levers 9 and 11 is already known, e.g. from the German patent document DE 195 40 782 C1, and is thus not explained in greater detail here.

The weighing sensor according to the invention has two additional arms 21 and 22 with articulation points 25. These additional arms 21 and 22 connect a vertical support 30, which has a projecting support area 38 for a calibration weight 40, with the load sensor 2 in a parallel motion arrangement. When the calibration weight rests on the scale, its weight force is transmitted to an extension 39 of the rectangular lever 9 via a projection 31 and a coupling element 26. The coupling element 26 has two parallel thin spots 27 and 28 at its ends and a thin spot 29 in the center, whose axis of rotation is perpendicular to the axes of rotation of the thin spots 27 and 28. This prevents constraining forces from acting on the extension 39 of the lever 9 if the support 30 and the support region 38 are slightly tilted—which may be caused, for example, by a tilting of the load sensor 2 when the load is off center.

If, in the lever 9/39, the lever arm between the bearing joint 19 and the thin spot 28 of the coupling element 26 is ten times larger than the lever arm between the bearing joint 19 and the force transmission element 8, a calibration weight 40 of e.g., 100 g acts exactly like a one kilogram-weight on a weighing pan connected with the load sensor 2. This high transmission ratio of 1:10 is easily obtained with the arrangement of the additional arms 21 and 22 on the left side (as seen in FIG. 1) of the load sensor 2 according to the invention, as there is sufficient space for the lever extension 39. In contrast, in the arrangement of the additional levers according to the prior art (e.g. DE 196 05 087), there is not enough room for a long lever arm between the (main) arms 3 and 4.

The lifting device for raising/lowering the calibration weight 40 is omitted in FIG. 1 for the sake of clarity, since it is conventional in the art. The position of the calibration weight shown in FIG. 1—resting on the support region 38—is the position during the calibration/adjustment process. In the weighing position, the calibration weight is raised and fixed to the housing. The arrangement of the calibration weight to the left of the load sensor 2, as shown in FIG. 1, has the further advantage, with respect to the lifting device, that, in a line of weighing sensors having different maximum loads, the same lifting device can be used both for weighing sensors configured according to the invention, where the calibration weight acts through leverage, and for low-load weighing sensors, where the calibration weight acts directly on the load sensor 2. In the latter case, with reference to FIG. 1, only the support region 38 would have to be connected to the load sensor 2, while the support 30, the additional arms 21 and 22 and the lever extension 39 would be eliminated.—It is also possible, to provide a slightly more complex lifting device, in which the calibration weight 40 can be lowered either onto the support region 38 (as shown in FIG. 1) or onto a receiving area connected with the load sensor 2 (not shown in FIG. 1). As a result, it is possible, in this variant, to provide a feature for occasionally checking the transmission ratio between the support using the lever transmission and the direct support.

If the support 30 is designed in such a way that the weight force to be measured can also be introduced at the support 30—as indicated by the dashed force arrow 35 in FIG. 1—the weighing sensor according to the invention offers the option to realize a scale with two weighing ranges. If the force to be measured is introduced at the load sensor 2 (force arrow 5) the weighing sensor has, for example, a maximum load of 10 kg and a resolution of 0.1 g. If the force to be measured is introduced at the support 30 (force arrow 35) the weighing sensor has a maximum load of 1 kg and a resolution of 0.01 g. Structurally, the switch in the force introduction can be implemented by providing, for instance, both the load sensor 2 and the support 30 with a blind hole at the top. The weighing pan can then be inserted into either one of these two blind holes.

Figure 2:
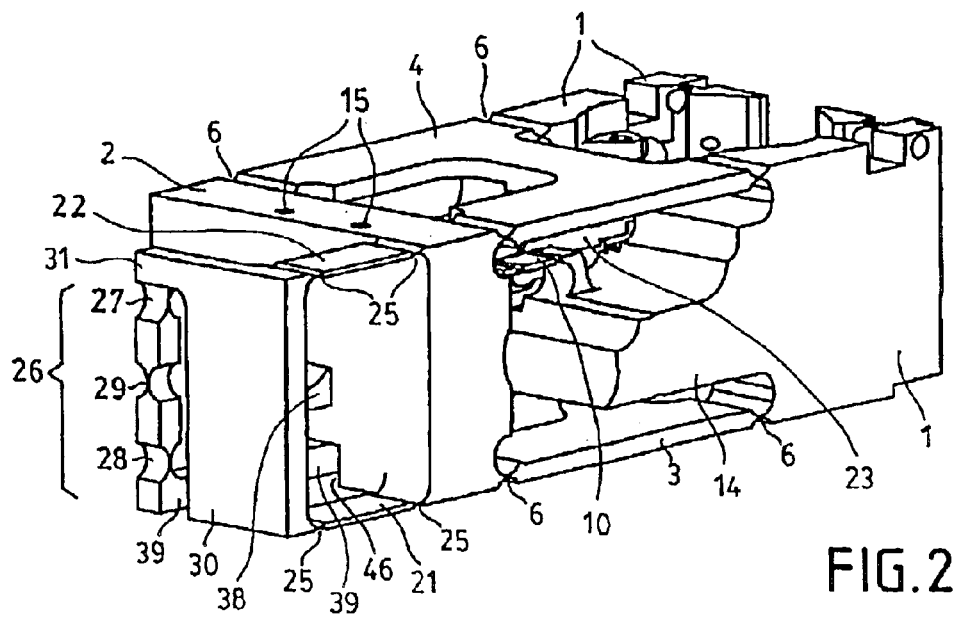
FIG. 2 shows a perspective view of the weighing sensor.

FIG. 2 is a perspective view of an actual embodiment of the weighing sensor. Parts corresponding to those in FIG. 1 are provided with the same reference numerals, although, in some cases, they appear different in FIG. 2. The figure shows the base 1, which is fixed to the housing, the two arms 3 and 4 and the load sensor 2. On its topside, the load sensor 2 has two threaded holes 15 for mounting the weighing pan (not depicted). The lever system 8 . . . 11 is mostly hidden behind the load sensor 2. Only the horizontal force transmission element 10 and the rear portion of the lever arm 23 of the lever 11 are visible. The two additional arms 21 and 22 with the articulation points 25 and connecting the support 30 with the load sensor 2 in a vertically displaceable manner are visible on the left, in front of the load sensor 2. The support 30 and the additional arms 21 and 22 are narrower than the load sensor 2, so that the coupling element 26 can be disposed next to the support 30 and nevertheless be in the center of the plane of symmetry of the entire weighing sensor, and, as a result, be located in the same plane as the extension 39 of the lever 9.

Furthermore, the arrangement of the coupling element 26 depicted in FIG. 2 provides, up to the very left edge of the weighing sensor, a maximum length for the extension 39 of the lever 9—for a given overall length of the weighing sensor—and consequently provides a maximum transmission ratio between the built-in calibration weight and the load on the load sensor that can be simulated thereby. This embodiment with the arrangement of the coupling element 26 on the far side of the calibration weight—as seen from the load sensor 2—is thus particularly advantageous. Irrespective of the diameter of the calibration weight, the entire length of the weighing sensor is used for the long lever arm 39 and thus for a high transmission ratio. In contrast, in the solution proposed in DE 100 07 267, the force of the calibration weight acts at its center of gravity, so that a length equaling half the diameter of the calibration weight is lost for the length of the long lever arm.

The function of the thin spots 27, 28 and 29 has already been explained with reference to FIG. 1. FIG. 2 clearly shows that the thin spot 29 is at about half the height of the weighing sensor, so that the axis of rotation defined by the thin spot 29 coincides as much as possible with the virtual axis of rotation about which the load sensor 2 rotates if the load is off-center.

The support region 38 for the calibration weight (not depicted in FIG. 2) is connected with the support 30 on the rear side thereof (not visible in FIG. 2).

The extension 39 of the lever 9 runs in a trough-shaped depression 46 in the load sensor 2.

FIG. 2 further shows that the base 1 fixed to the housing, the load sensor 2, the two arms 3 and 4, the lever system (8 . . . 11), the two additional arms 21 and 22, the coupling element 26, the support 30, and the support region 38 for the calibration weight are monolithically formed from a single metal block. This type of construction ensures high reproducibility of the weighing sensor and the calibration/ adjustment because it avoids the geometric changes caused by microslippage, which are unavoidable in weighing sensors assembled from individual components.

The usual adjustment to ensure that the parallel guidance from the arms 3 and 4 is free from eccentric loading is effected by removing a small amount of material from the thin spots 6. Likewise, the adjustment of the parallel guidance from the additional arms 21 and 22 is effected by removing a small amount of material from the thin spots 25.

The arrangement according to the invention of the two additional arms 21 and 22 and the support 30 with the support region 38 left of the load sensor 2—as depicted in FIGS. 1 and 2—has the further advantage that there is sufficient room for the calibration weight 40. This makes possible various shapes of the calibration weight. FIG. 1 shows a cylindrical calibration weight. To increase its mass, this weight can be provided with dumbbell-shaped enlargements at the ends. U-shaped calibration weights with lateral sides that open towards the bottom are also feasible. For large masses, this makes it possible to bring the center of gravity of the calibration weight closer to the support 30 (decreasing the loading of the additional arms 21 and 22, so that these arms can be made thinner). It is also possible to adjust the center of gravity of the calibration weight in the vertical direction by adjusting the length of the lateral sides. This enables bringing the center of gravity, e.g., to the height of the thin spot 29 of the coupling element 26, which is advantageous in many cases.

The invention has been described using the example of a lever system with two levers. The invention can also be used in conjunction with other lever systems, e.g., a lever system with three levers, as disclosed in DE 199 23 207.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. Weighing sensor comprising:
   a base fixed to a housing,
   a load sensor displaceably connected with the base via two main arms,
   a lever system having at least one lever and transmitting a load acting on the load sensor to a transducer, and
   a built-in calibration weight arranged to be lowered onto a support region for at least one of checking and calibrating the sensitivity of the weighing sensor,
   two additional arms parallel-guiding the support region,
   wherein the support region is connected with a lever of the lever system via a coupling element,
   wherein the two additional arms are connected both with the support region and with the load sensor and are located on the side of the load sensor opposite the lever system.

2. Weighing sensor as claimed in claim 1, wherein the calibration weight is located between the coupling element and the load sensor.

3. Weighing sensor as claimed in claim 1, wherein the coupling element has three thin spots.

4. Weighing sensor as claimed in claim 3, wherein a central one of the thin spots is located approximately equidistant between the main arms.

5. Weighing sensor as claimed in claim 4, wherein the axis of the central thin spots is at a right angle to the axes of two outer ones of the thin spots.

6. Weighing sensor as claimed in claim 3, wherein the axis of a central one of the thin spots is at right angles to the axes of two outer ones of the thin spots.

7. Weighing sensor as claimed in claim 1, wherein the additional arms are narrower than the main arms.

8. Weighing sensor as claimed in claim 1, wherein the base, the load sensor, the two arms, the lever system, the two additional arms, the coupling element and the support with the support region for the calibration weight are monolithically formed from a single metal block.

9. Weighing sensor as claimed in claim 1, wherein the center of gravity of the calibration weight is proximate to the coupling element.

10. Weighing sensor as claimed in claim 1, wherein the support region is configured to allow loading of the weighing sensor on the load sensor or on the support region.

11. A weighing scale including a weighing sensor comprising:
    a base;
    a load sensor movable relative to the base;
    a calibration support movable relative to the load sensor;
    one or more arms connecting the load sensor with the calibration support;
    first levers extending between and connecting the base and the load sensor; and
    second levers extending between the load sensor and the calibration support, at least the first levers transmitting a load acting on the load sensor to a transducer;
    wherein the load sensor is located between the base and the calibration support.

12. The weighing scale according to claim 11, wherein the first levers comprise a first and a second lever arm; and the second levers comprise a first and a second additional lever arm.

13. The weighing scale according to claim 11, further comprising third levers extending between and connecting the base and the calibration support.

14. The weighing scale according to claim 11, wherein the base, the load sensor, the calibration support, and the first and second levers are machined as a unit from a single block of material.

15. The weighing scale according to claim 11, further comprising a calibration weight supported in a space between the calibration support and the load sensor.

* * * * *